(12) United States Patent
Chen

(10) Patent No.: US 8,305,693 B1
(45) Date of Patent: Nov. 6, 2012

(54) ZOOM LENS SYSTEM WITH WIDE ANGLE OF VIEW

(75) Inventor: Su-Due Chen, Taichung (TW)

(73) Assignee: Zoom Precision Optical Electronic Co., Ltd., Taichung (TW)

( * ) Notice: Subject to any disclaimer, the term of this patent is extended or adjusted under 35 U.S.C. 154(b) by 58 days.

(21) Appl. No.: 13/093,031

(22) Filed: Apr. 25, 2011

(51) Int. Cl.
*G02B 15/14* (2006.01)
(52) U.S. Cl. ........................................ 359/686; 359/676
(58) Field of Classification Search .................. 359/676, 359/686–688
See application file for complete search history.

(56) References Cited

U.S. PATENT DOCUMENTS 4,281,906 A * 8/1981 Tanaka .......................... 359/688

* cited by examiner

*Primary Examiner* — William Choi

(57) ABSTRACT

A high zoom ratio wide-angle zoom lens system includes a first lens group comprising a first lens of biconcave, a second lens of positive meniscus, a third lens of biconvex, and a fourth lens of biconvex wherein the first lens and the second lens are lenses not cemented together by adhesive; a second lens group comprising a fifth lens of positive meniscus, a sixth lens of biconcave, a seventh lens of biconvex, and an eighth lens of plano-concave; a third lens group comprising a ninth lens of biconvex; and a fourth lens group comprising a tenth lens of biconvex, an eleventh lens of plano-concave, a twelfth lens of biconvex, and a thirteenth lens of biconcave. The zoom lens system has a wide angle of view of at least 70-degree, high zoom ratio, and other advantages.

5 Claims, 17 Drawing Sheets

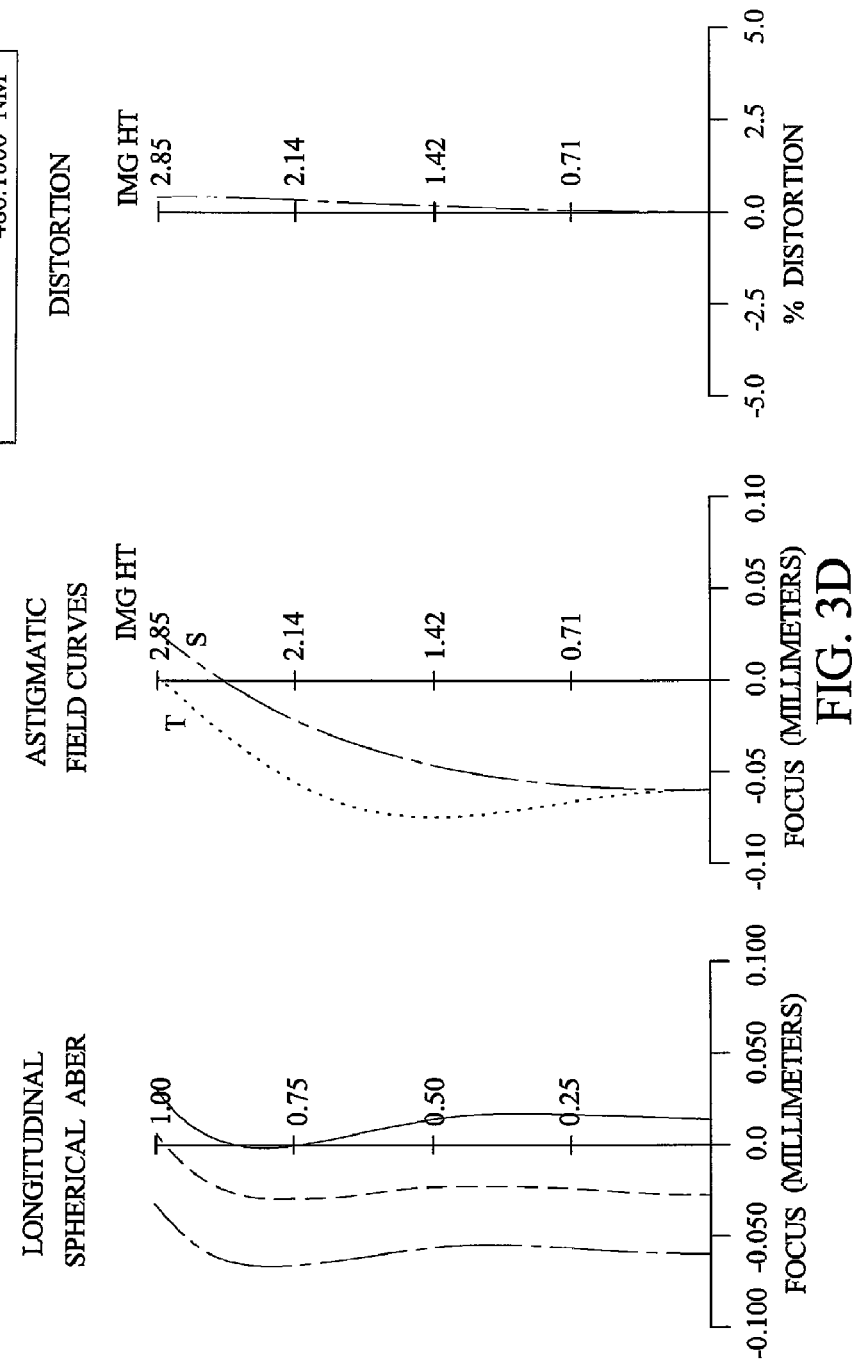

ZOOM LENS SYSTEM WITH WIDE ANGLE OF VIEW

BACKGROUND OF THE INVENTION

1. Field of the Invention

The invention relates to zoom lens systems for compact video cameras, electronic still cameras, digital cameras, etc. and more particularly to such a high zoom ratio wide-angle zoom lens system having a first lens group of positive diopter, a second lens group of negative diopter, a third lens group of positive diopter, and a fourth lens group of positive diopter so as to have a wide angle of view greater than 70 degrees and more than 10× zoom ratio.

2. Description of Related Art

Recently, compact zoom lens systems as the most important component for a compact video camera, an electronic still camera, digital camera, etc. are developed and commercially available. A compact zoom lens has the benefits of decreasing weight and greatly reducing cost. As a result, for example, the size, weight, and unit price of a compact video camera are decreased greatly.

To achieve the above objective, the focus mechanism is moved from the front element (or first element) to the least lens set. It has the benefits of greatly reducing the size of the first lens group so as to achieve the goal of minimizing the zoom lens system. This in turn can decrease power required for focusing. Therefore, a quick focusing can be achieved.

However, aberration of the rear focusing arrangement is not easy to control. This in turn can increase the difficulty of focusing and lower the image quality due to the increase of zooming range.

Moreover, there are a number of drawbacks associated with rear focusing arrangement systems such as lower resolution, limited angle of view (or angle in short), great distortion, somewhat bulky for carry, and inconvenience in use.

For a digital video camera (DVC) having the features of being lightweight and compact, its lens system cannot achieve the goal of having a wide angle (e.g., about 60-degree of angle) due to optical limitations. Further, there is no suggestion in prior art literatures about a high zoom ratio wide-angle zoom lens system having at least 64-degree angle. Thus, the need for improvement still exists.

SUMMARY OF THE INVENTION

It is therefore one object of the invention to provide a high zoom ratio wide-angle zoom lens system comprising a first lens group comprising a first lens of biconcave, a second lens of positive meniscus, a third lens of biconvex, and a fourth lens of biconvex wherein the first lens and the second lens are lenses not cemented together by adhesive; a second lens group comprising a fifth lens of positive meniscus, a sixth lens of biconcave, a seventh lens of biconvex, and an eighth lens of plano-concave; a third lens group comprising a ninth lens of biconvex; and a fourth lens group comprising a tenth lens of biconvex, an eleventh lens of plano-concave, a twelfth lens of biconvex, and a thirteenth lens of aspheric; wherein the zoom lens system satisfies the following conditions (a)-(e): (a): $-20.03<R1/R2<-1.89$; (b): $0.13<f_w/f_1<0.14$; (c): $-0.6<f_w/f_2<-0.53$; (d): $0.11<f_w/f_3<0.14$; and (e): $0.18<f_w/f_4<0.21$ where R1 is a curvature of a first surface of the first lens, R2 is a curvature of a second surface of the first lens, $f_w$ is a focal length of the overall system at a wide angle, $f_1$ is a focal length of the first lens group, $f_2$ is a focal length of the second lens group, $f_3$ is a focal length of the third lens group, and $f_4$ is a focal length of the fourth lens group.

It is another object of the invention to provide a high zoom ratio wide-angle zoom lens system having a wide angle of view greater than 70 degrees and more than 10× zoom ratio. Moreover, the invention is a miniature system so as to greatly decrease size of the image fetching device. Further, the invention can be made of plastic aspheric lenses and conventional glass lenses so as to greatly reduce the manufacturing cost, have a simple construction, and be easy to assemble.

The above and other objects, features and advantages of the invention will become apparent from the following detailed description taken with the accompanying drawings.

BRIEF DESCRIPTION OF THE DRAWINGS

FIG. 3D plots curves of longitudinal spherical aberration versus focal length, astigmatic field curves versus focal length, and a curve of distortion versus focal length according to the second preferred embodiment at the narrow angle respectively;

DETAILED DESCRIPTION OF THE INVENTION

Figure 1:
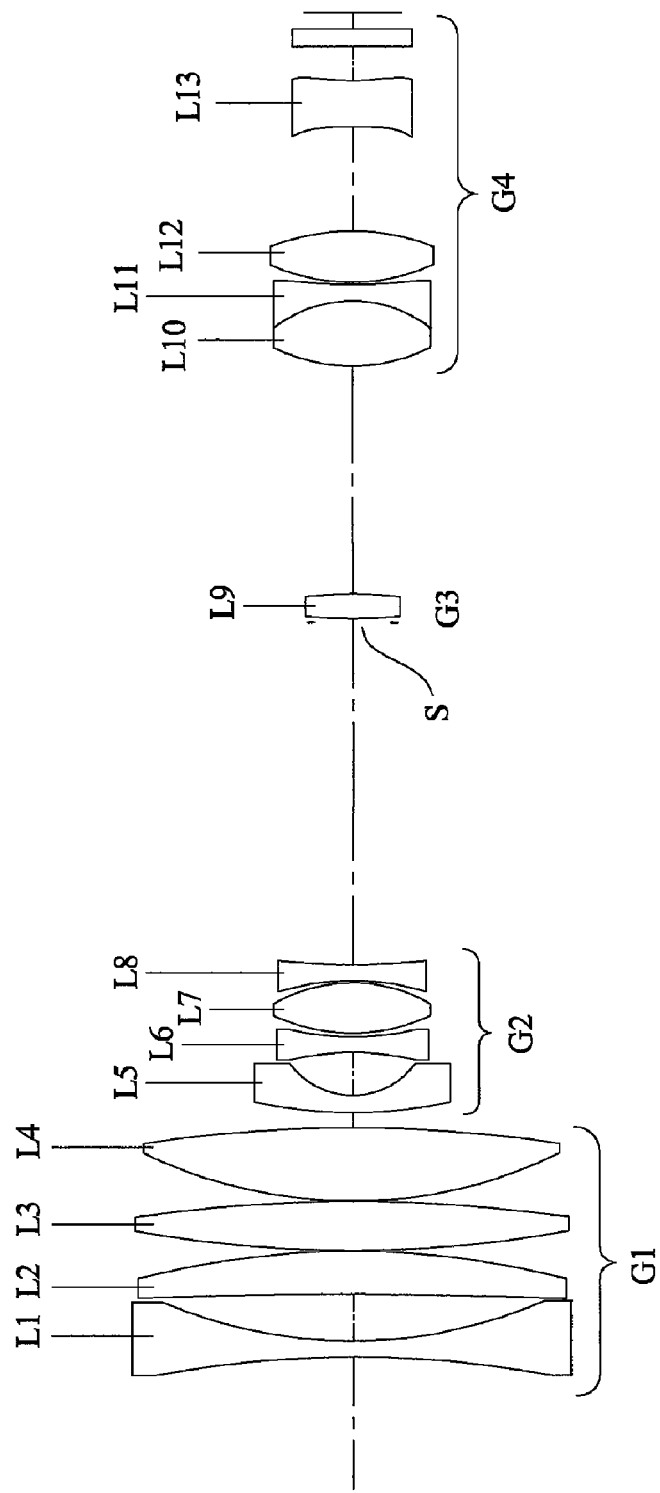
FIG. 1 schematically depicts in section of locations of all lenses of a zoom lens system according to the invention.

Referring to FIG. 1, a high zoom ratio wide-angle zoom lens system in accordance with the invention is shown. The zoom lens system comprises 13 lenses divided into a front first lens group G1, a front second lens group G2 adjacent to the first lens group G1, an intermediate third lens group G3, and a rear fourth lens group G4. The first lens group G1 is of positive diopter, the second lens group G2 is of negative diopter, the third lens group G3 is of positive diopter, and the fourth lens group G4 is of positive diopter. Position of the first lens group G1 is fixed during zooming and focusing. The second lens group G2 that is moved for zooming along the optical axis. Position of the third lens group G3 is fixed during zooming and focusing. The fourth lens group G4 that is moved along the optical axis to correct any shift in the focal position due to zooming.

The first lens group G1 comprises a first lens L1 of biconcave, a second lens L2 of positive meniscus, a third lens L3 of biconvex, and a fourth lens L4 of biconvex. The second lens group G2 comprises a fifth lens L5 of positive meniscus, a sixth lens L6 of biconcave, a seventh lens L7 of biconvex, and an eighth lens L8 of plano-concave. The third lens group G3 comprises a ninth lens L9 of biconvex. Aperture is designated by reference numeral "S" in front of the ninth lens L9. The fourth lens group G4 comprises a tenth lens L10 of biconvex, an eleventh lens L11 of plano-concave, a twelfth lens L12 of biconvex, and a thirteenth lens L13 of biconcave. Preferably, the first lens L1 and the second lens L2 are lenses not cemented together by adhesive.

For achieving the goals of having a wide angle of at least 70-degree and "10×" zoom ("10×" zoom means a zoom lens with focal lengths ranging from 100 mm to 1,000 mm), the zoom lens system of the invention is required to satisfy the following conditions:

(a) $-20.03 < R1/R2 < -1.89$;
(b) $0.13 < f_w/f_1 < 0.14$;
(c) $-0.60 < f_w/f_2 < -0.53$;
(d) $0.11 < f_w/f_3 < 0.14$; and
(e) $0.18 < f_w/f_4 < 0.21$;

where R1 is a curvature of a first surface of the first lens L1, R2 is a curvature of a second surface of the first lens L2, $f_w$ is a focal length of the overall system at a wide angle, $f_1$ is a focal length of the first lens group G1, $f_2$ is a focal length of the second lens group G2, $f_3$ is a focal length of the third lens group G3, and $f_4$ is a focal length of the fourth lens group G4.

Preferably, the seventh and the thirteenth lenses L7, L13 are aspheric lenses. The remaining lenses are conventional glass lenses so as to reduce the production cost. The invention can have a wide angle and an increased ratio of its longest to shortest focal lengths, and can be made compact and has improved image quality because the aspheric lenses can greatly decrease aberration beyond the optical axis.

Preferably, the second and third lenses L2, L3 are formed as single lenses and are cemented together by applying adhesive therebetween. Hence, there is no distance between the second and third lenses L2 and L3 so as to facilitate assembly.

First Embodiment

Figure 2A:
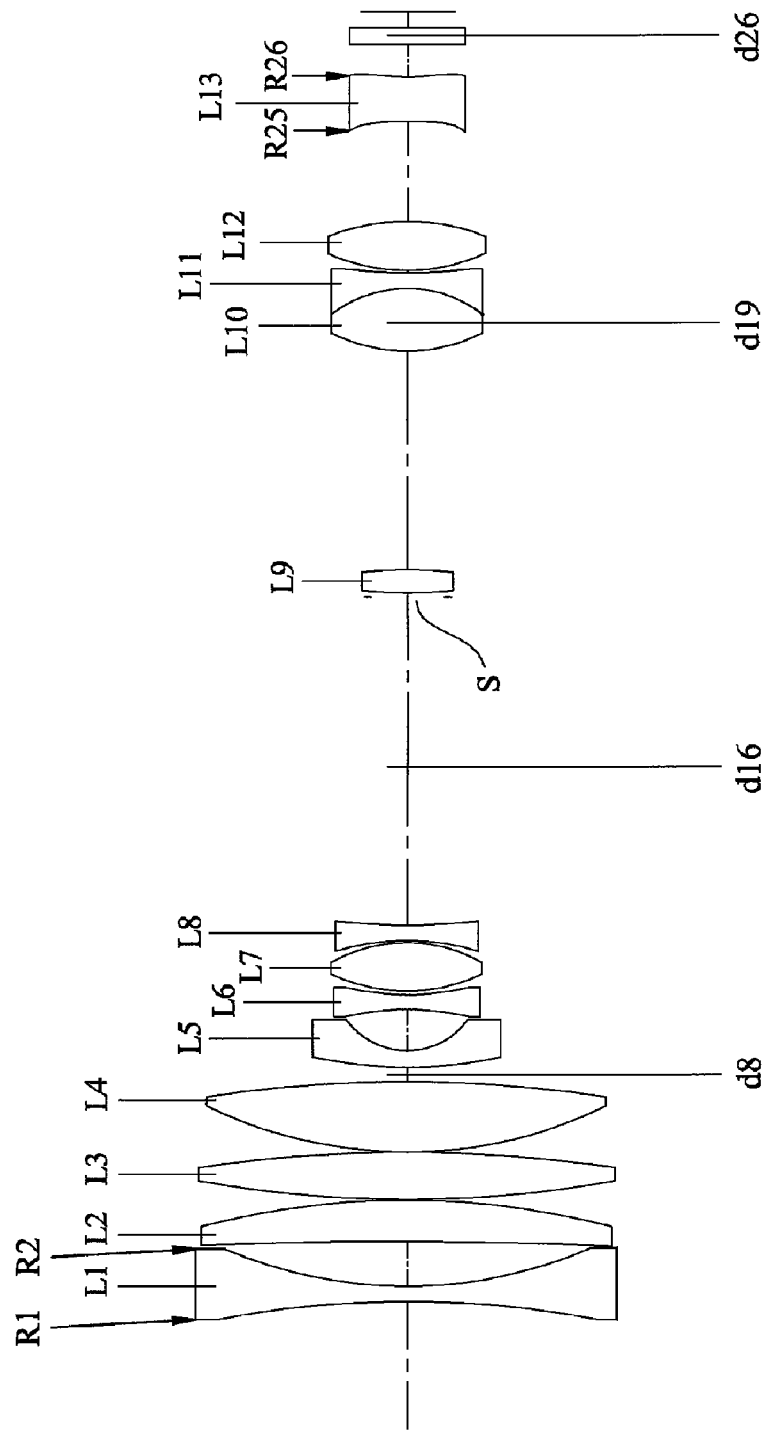
FIG. 2A schematically depicts in section of locations of the lenses of FIG. 1 at a wide angle according to a first preferred embodiment of the invention.
Figure 2B:
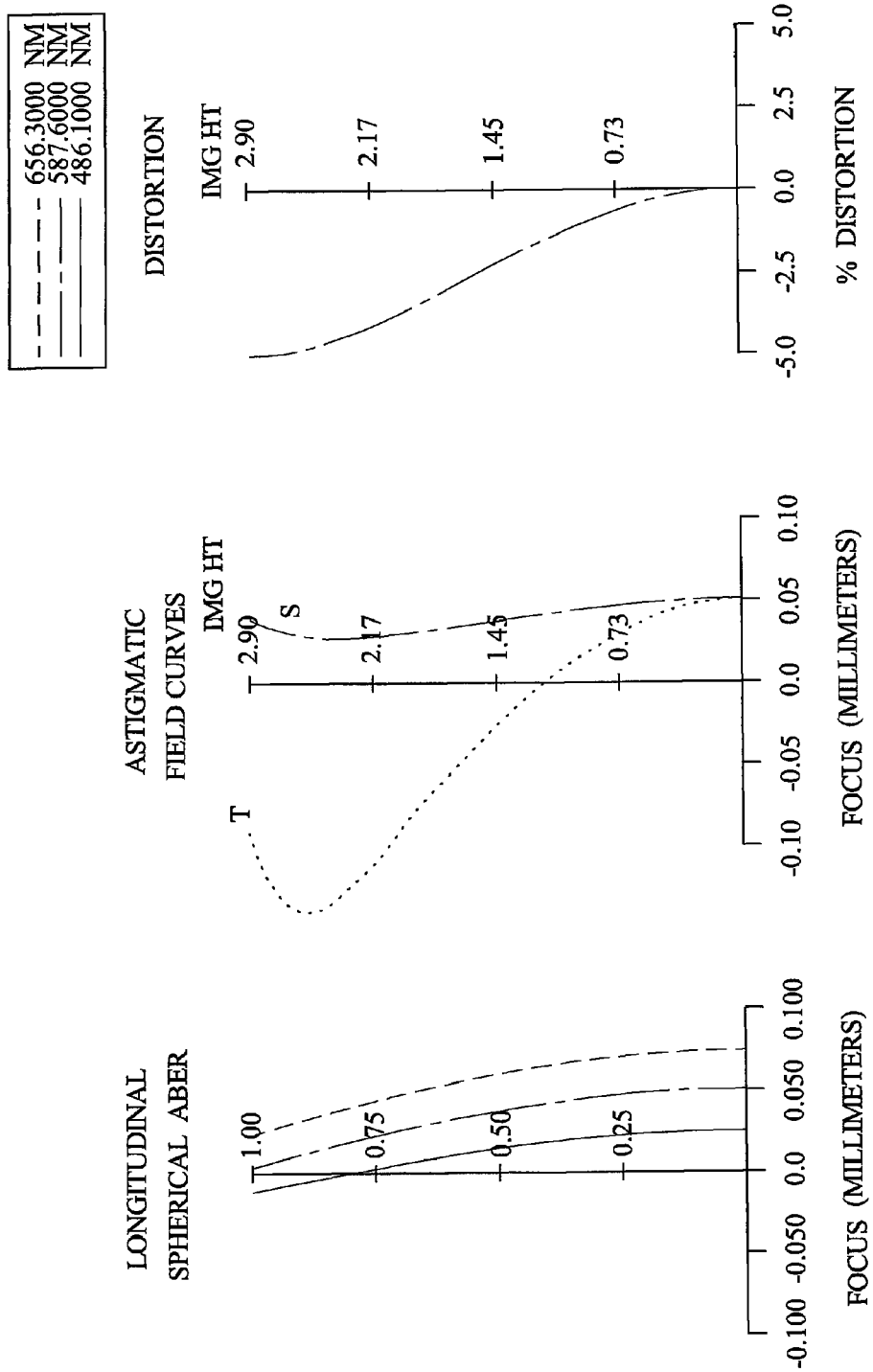
FIG. 2B plots curves of longitudinal spherical aberration versus focal length, astigmatic field curves versus focal length, and a curve of distortion versus focal length according to the first preferred embodiment at the wide angle respectively.
Figure 2C:
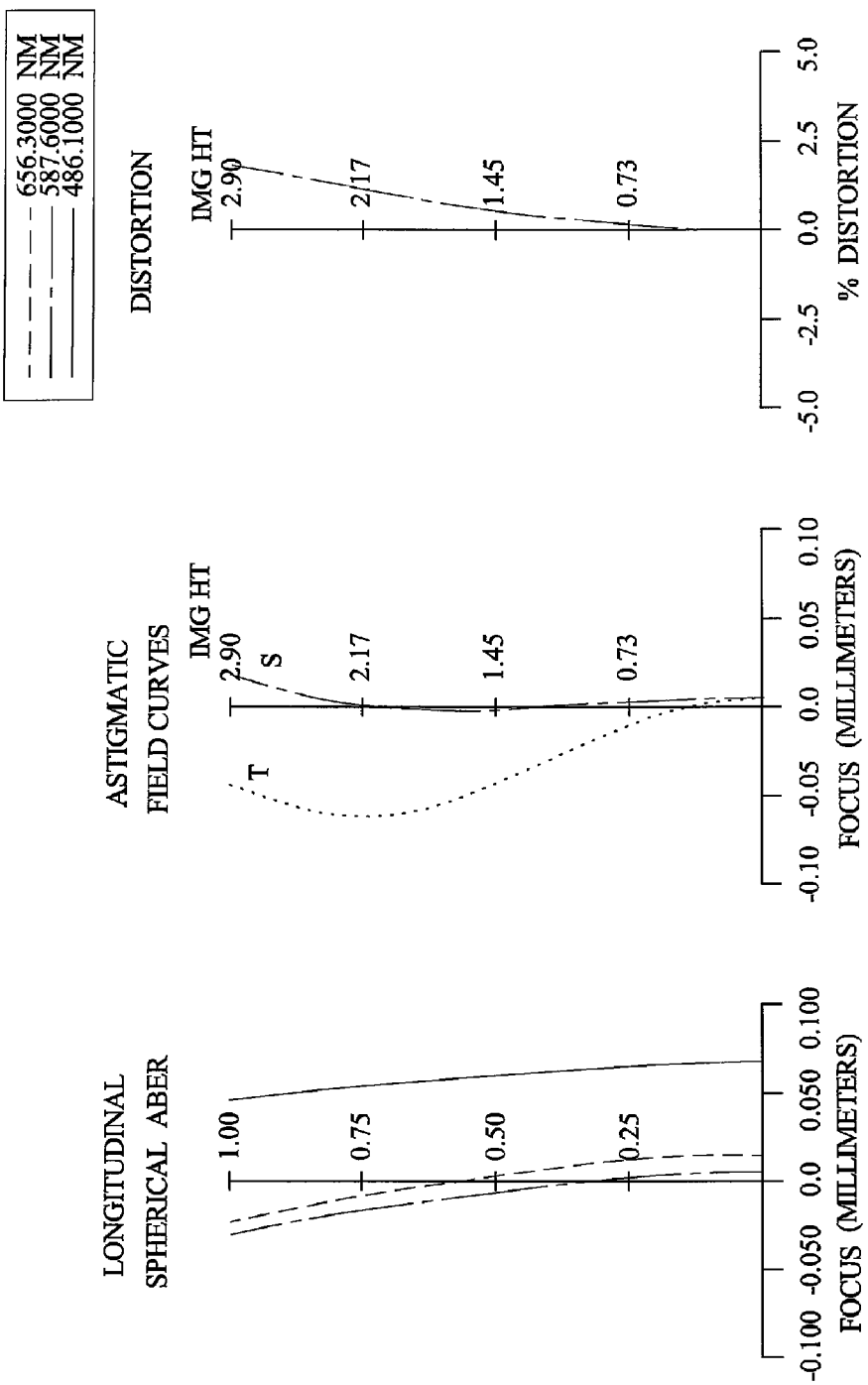
FIG. 2C plots curves of longitudinal spherical aberration versus focal length, astigmatic field curves versus focal length, and a curve of distortion versus focal length according to the first preferred embodiment at an intermediate focal length respectively.
Figure 2D:
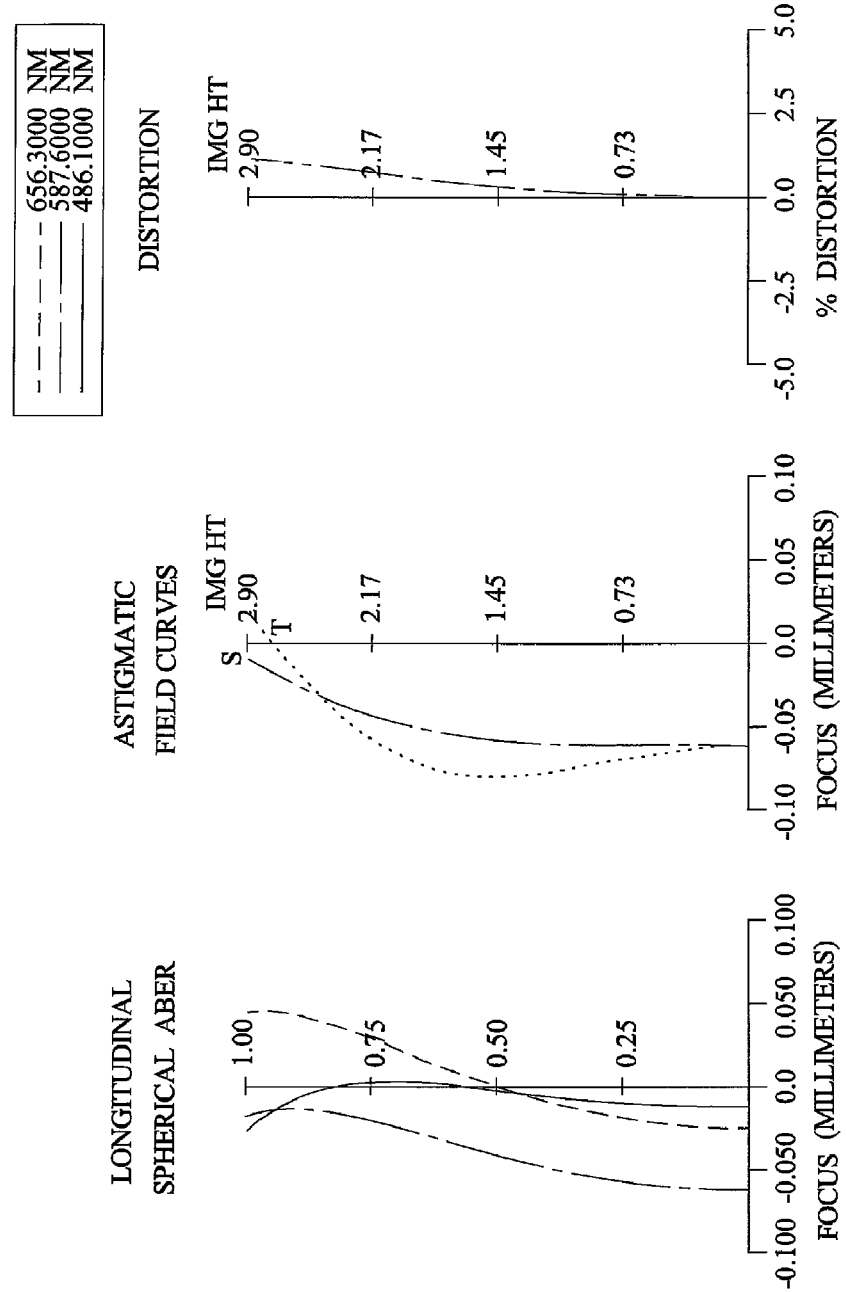
FIG. 2D plots curves of longitudinal spherical aberration versus focal length, astigmatic field curves versus focal length, and a curve of distortion versus focal length according to the first preferred embodiment at a narrow angle respectively.
Figure 3A:
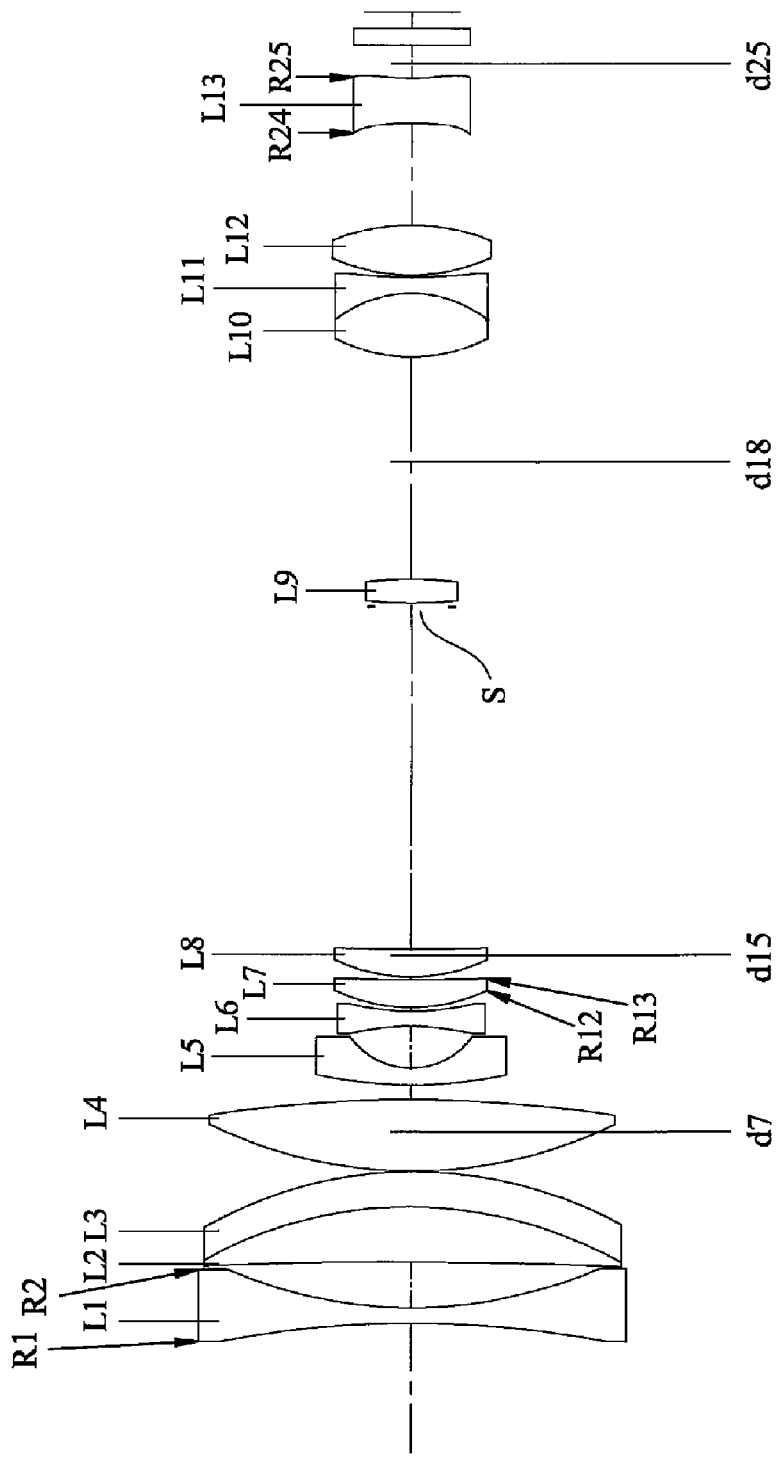
FIG. 3A schematically depicts in section of locations of the lenses of FIG. 1 at the wide angle according to a second preferred embodiment of the invention.
Figure 3B:
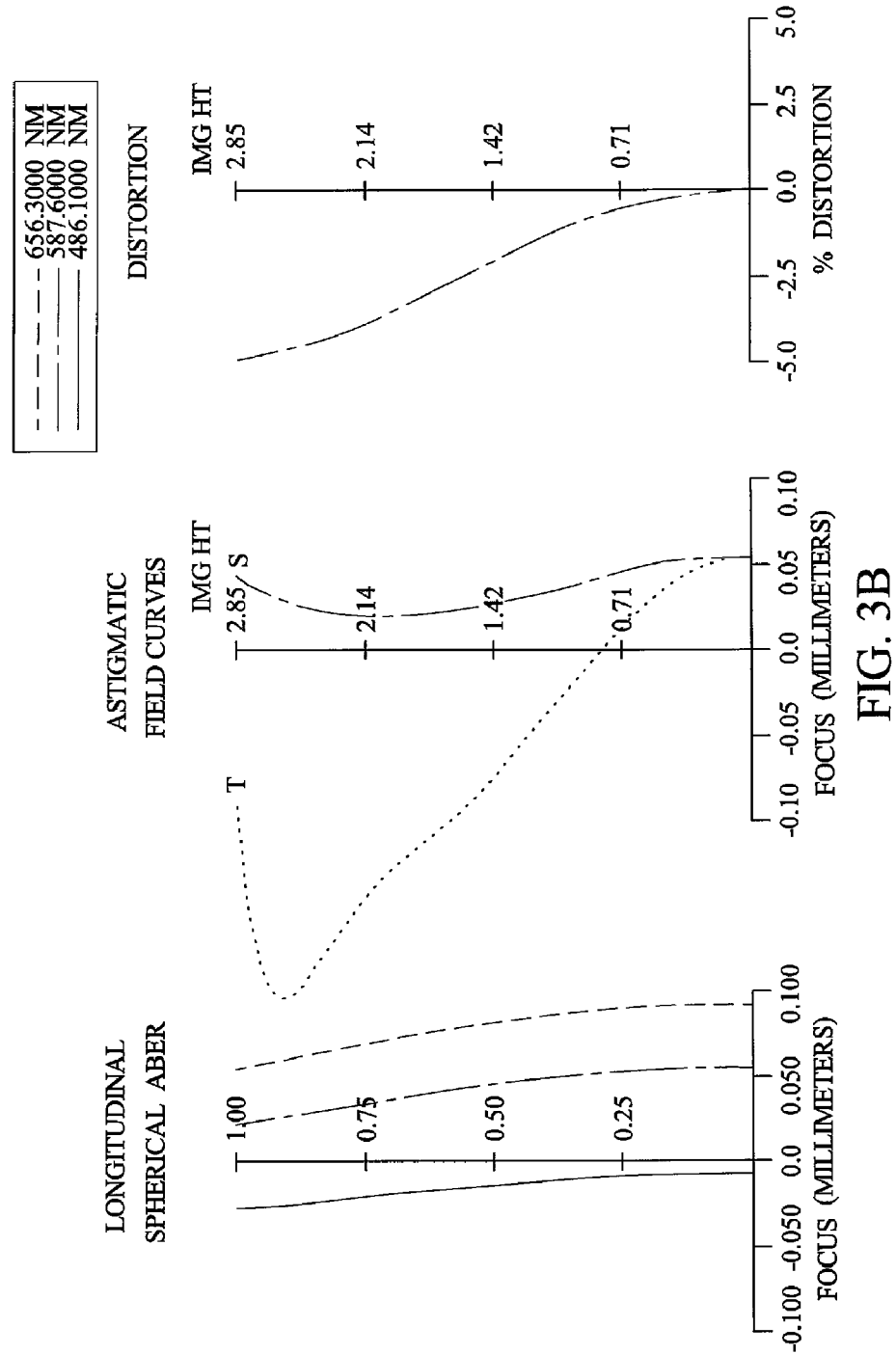
FIG. 3B plots curves of longitudinal spherical aberration versus focal length, astigmatic field curves versus focal length, and a curve of distortion versus focal length according to the second preferred embodiment at the wide angle respectively.
Figure 3C:
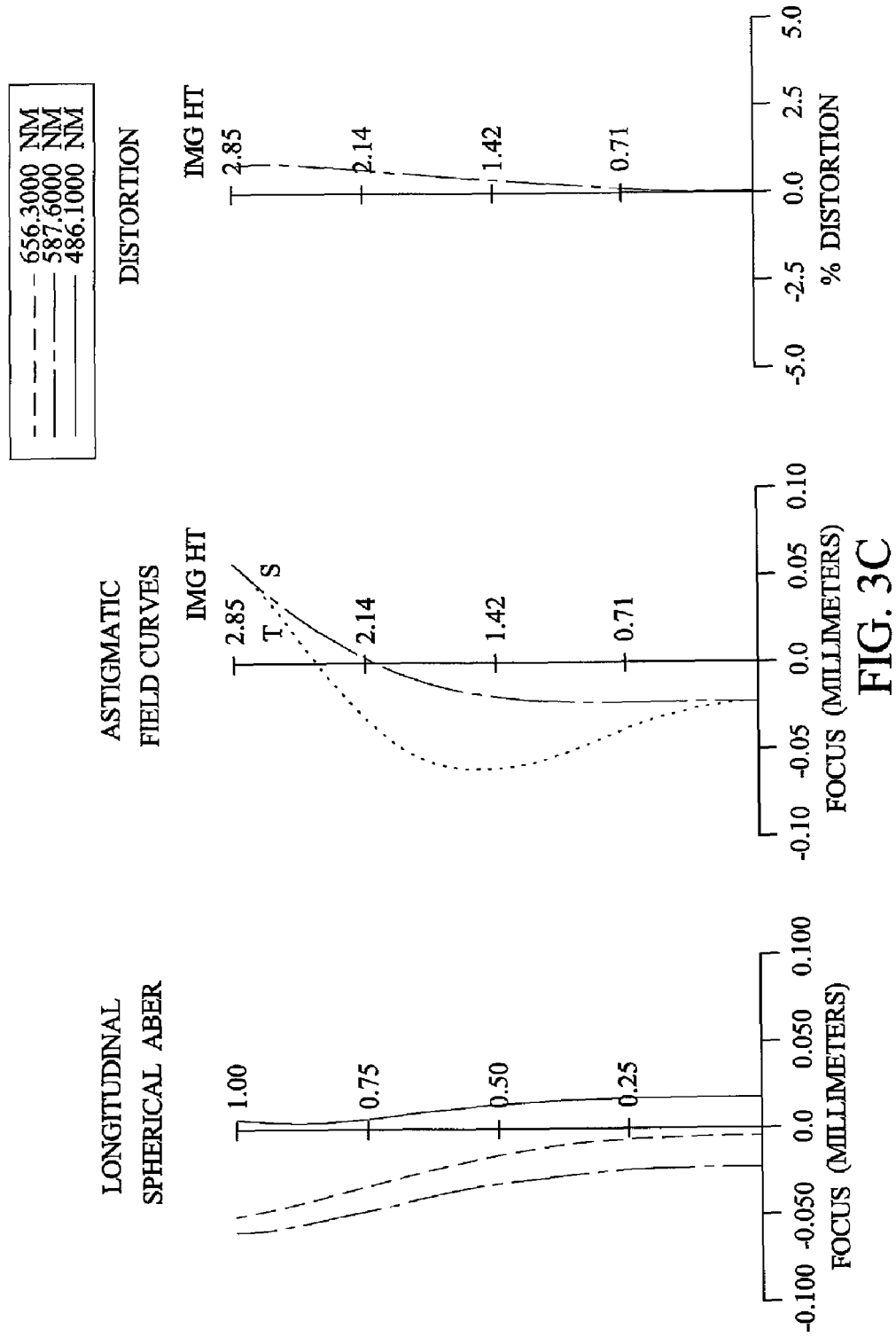
FIG. 3C plots curves of longitudinal spherical aberration versus focal length, astigmatic field curves versus focal length, and a curve of distortion versus focal length according to the second preferred embodiment at the intermediate focal length respectively.
Figure 4A:
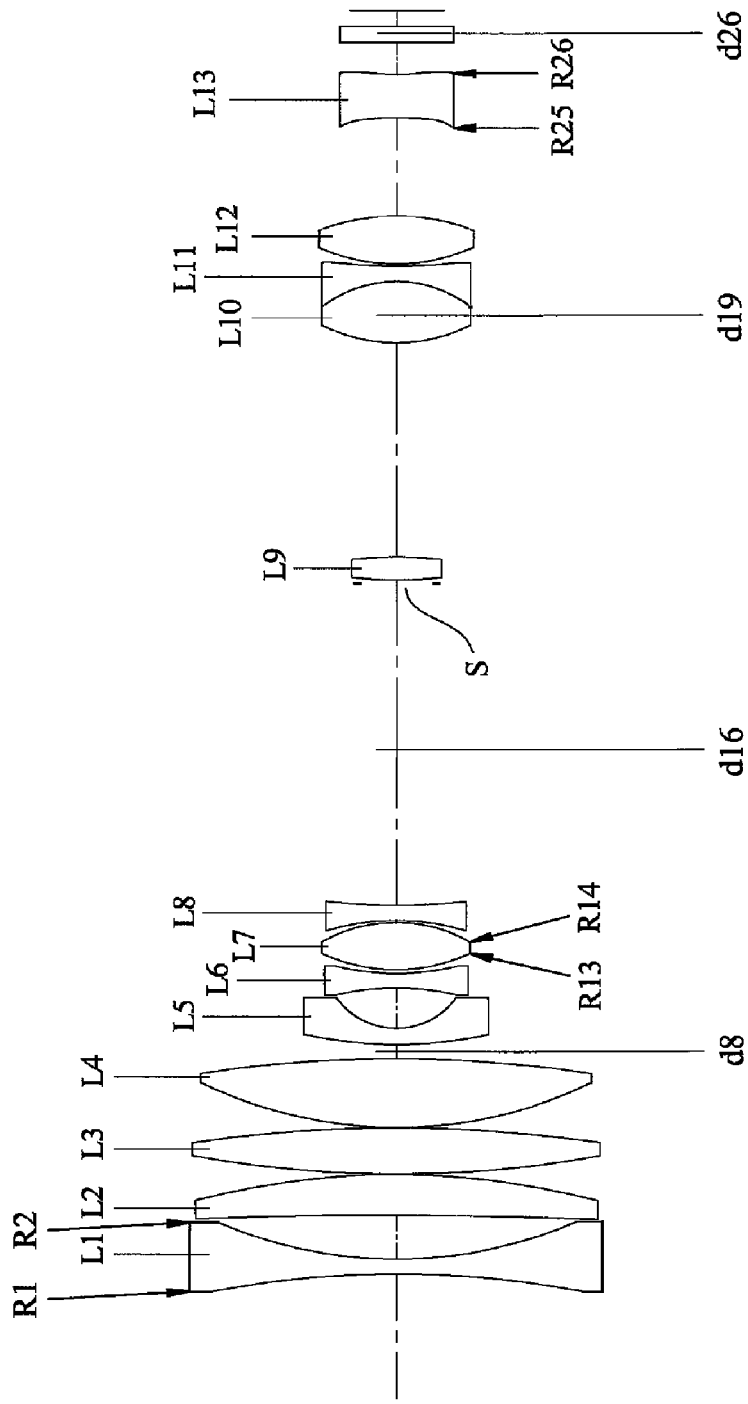
FIG. 4A schematically depicts in section of locations of the lenses of FIG. 1 at the wide angle according to a third preferred embodiment of the invention.
Figure 4B:
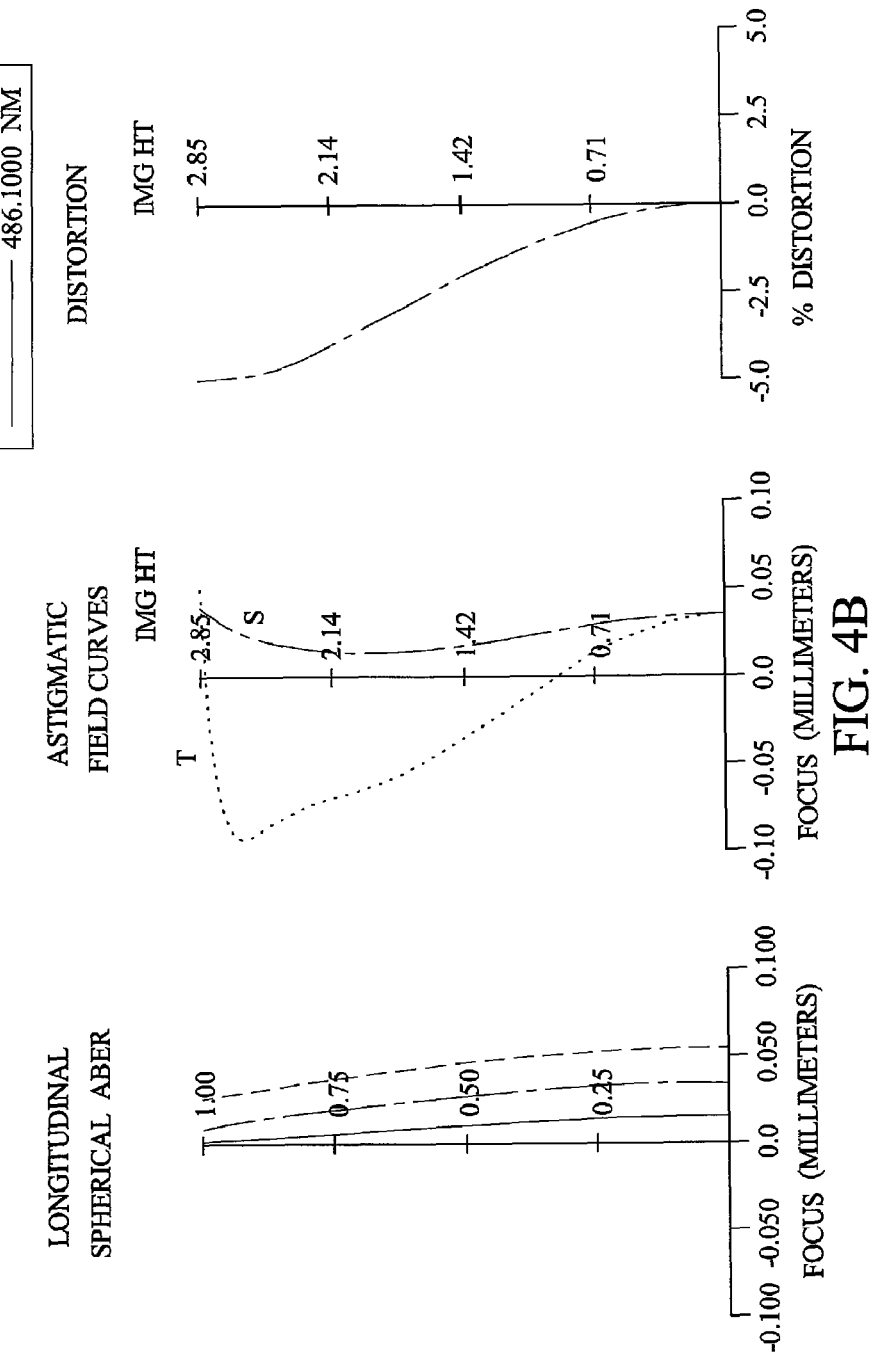
FIG. 4B plots curves of longitudinal spherical aberration versus focal length, astigmatic field curves versus focal length, and a curve of distortion versus focal length according to the third preferred embodiment at the wide angle respectively.
Figure 4C:
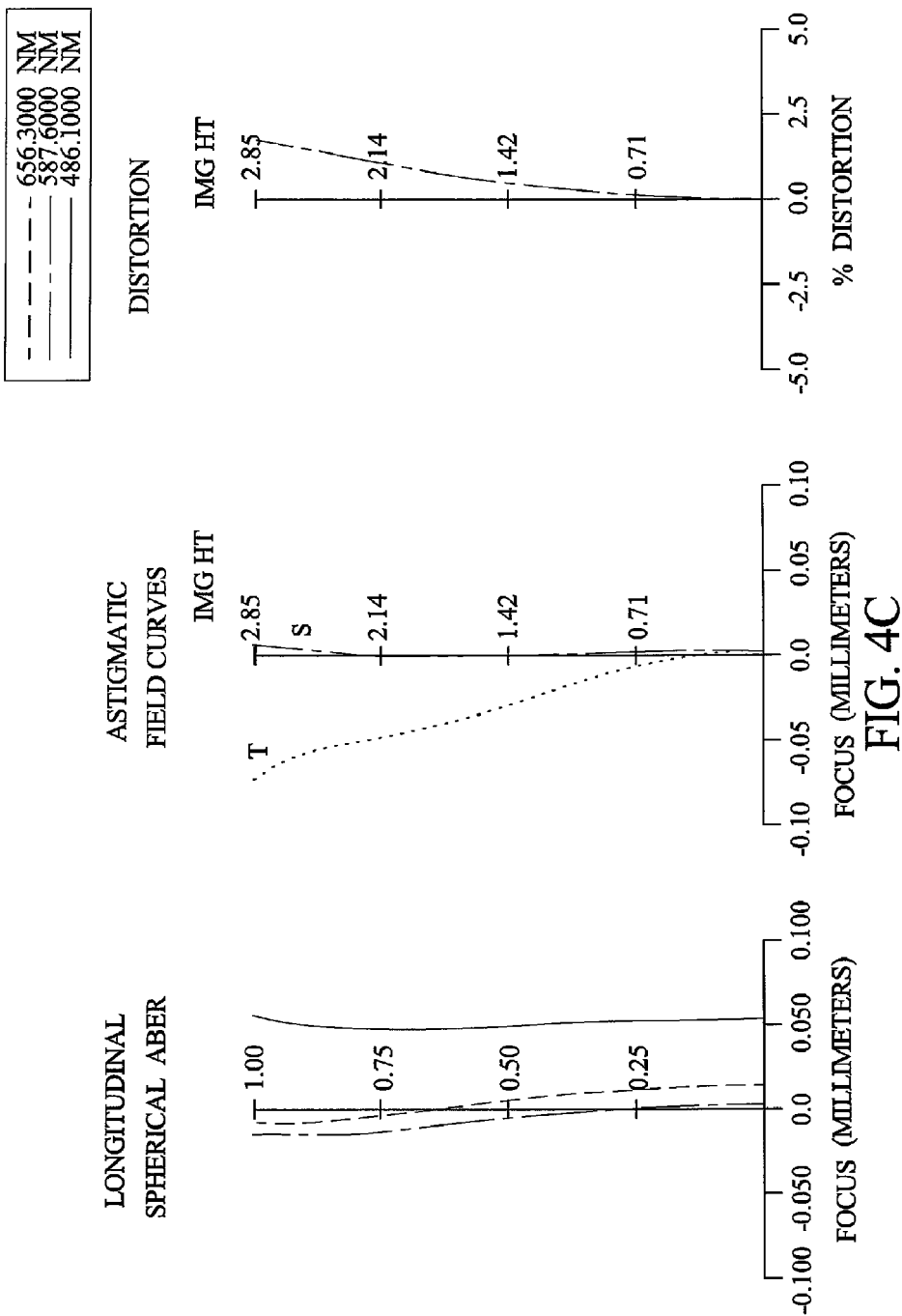
FIG. 4C plots curves of longitudinal spherical aberration versus focal length, astigmatic field curves versus focal length, and a curve of distortion versus focal length according to the third preferred embodiment at the intermediate focal length respectively.
Figure 4D:
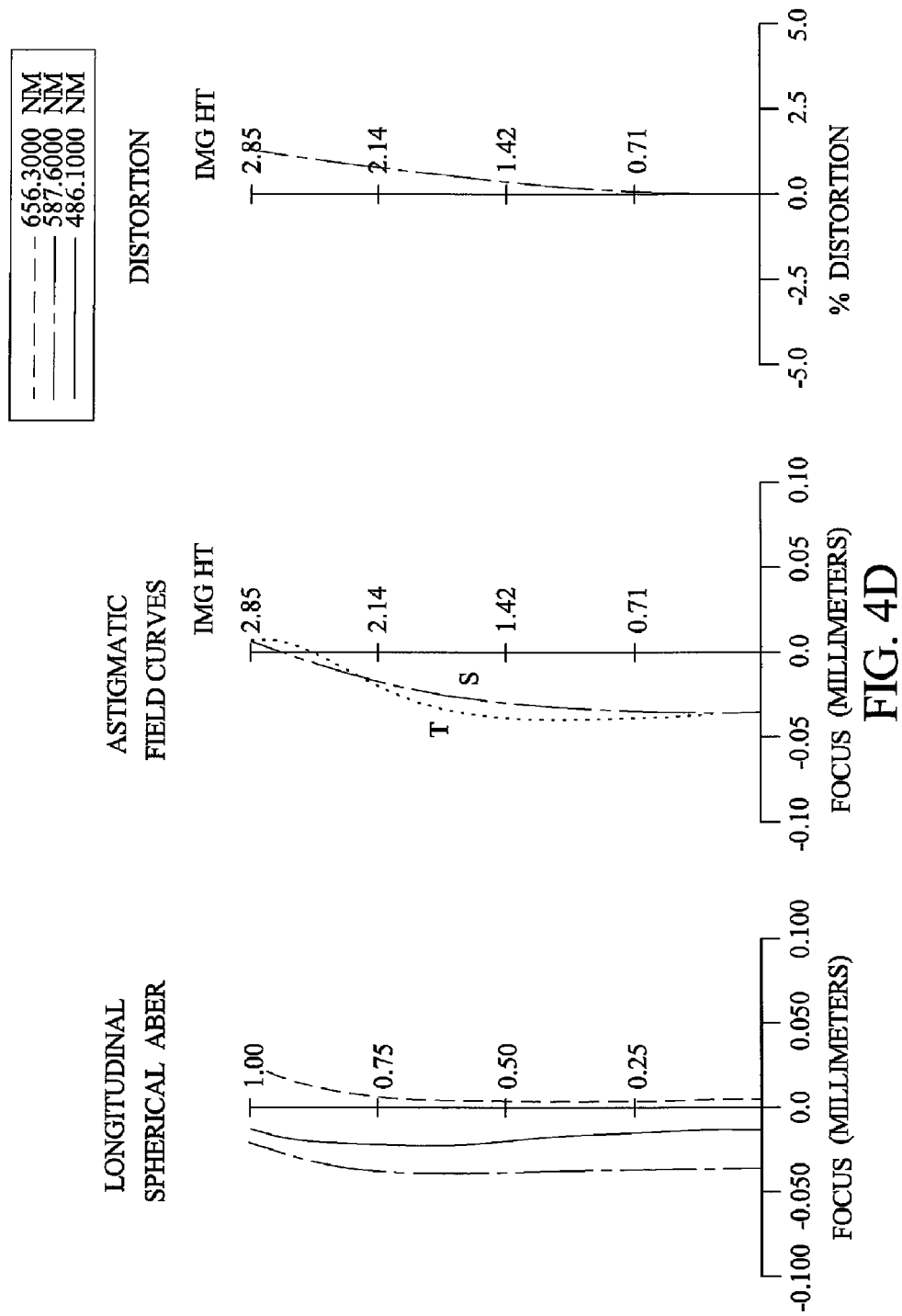
FIG. 4D plots curves of longitudinal spherical aberration versus focal length, astigmatic field curves versus focal length, and a curve of distortion versus focal length according to the third preferred embodiment at the narrow angle respectively.
Figure 5A:
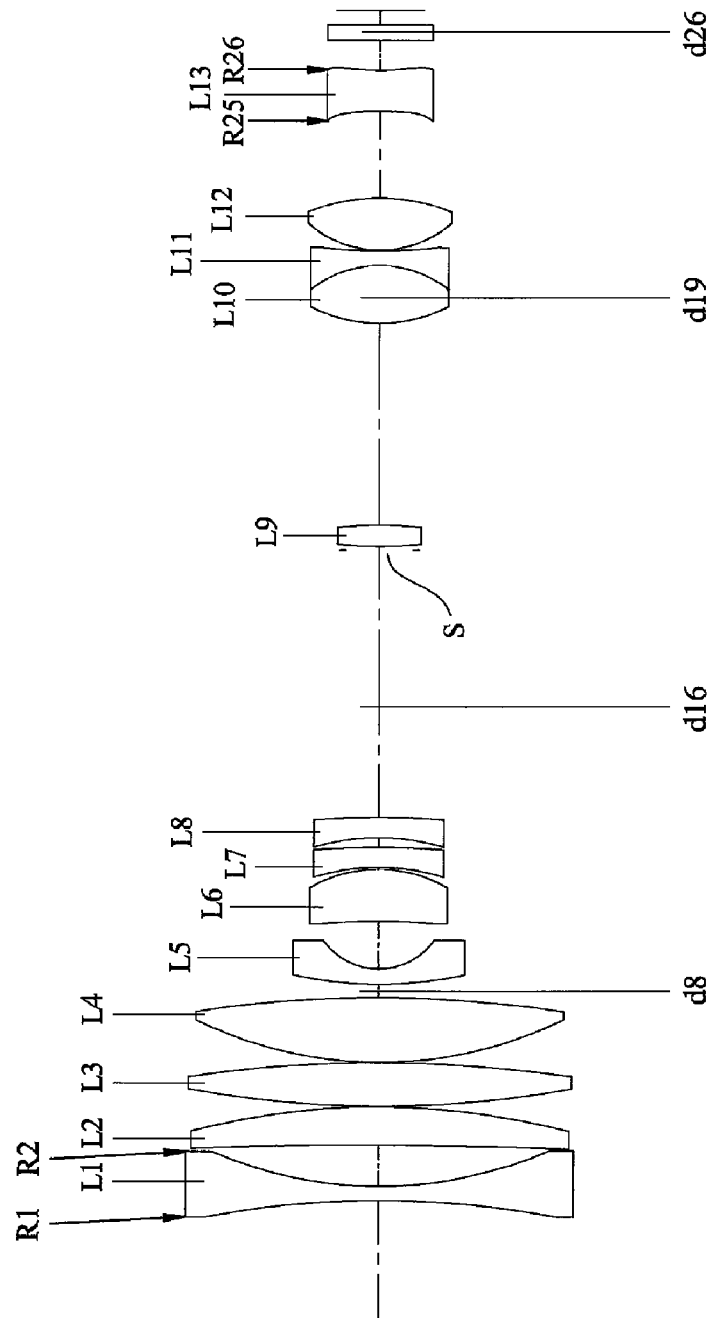
FIG. 5A schematically depicts in section of locations of the lenses of FIG. 1 at the wide angle according to a fourth preferred embodiment of the invention.
Figure 5B:
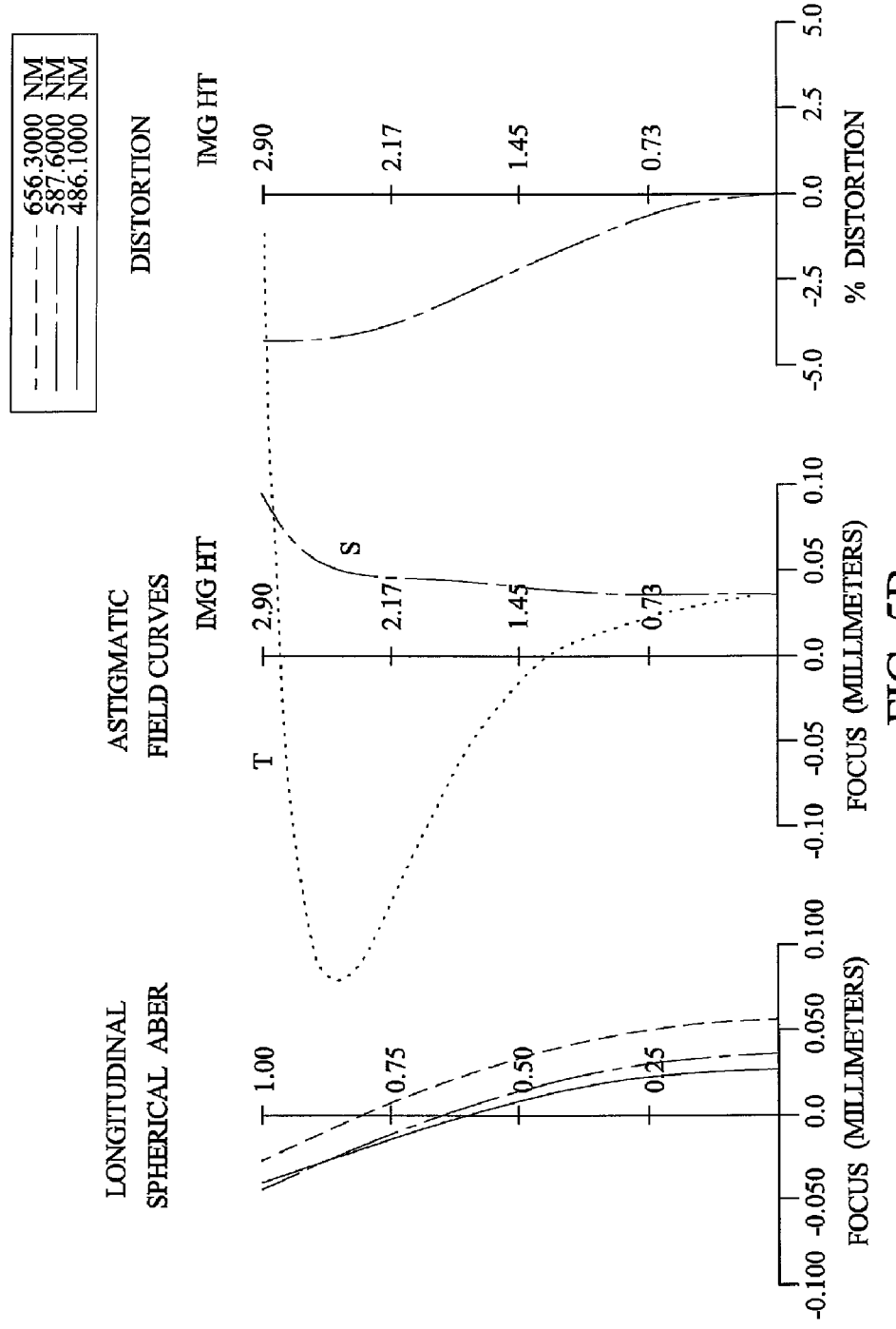
FIG. 5B plots curves of longitudinal spherical aberration versus focal length, astigmatic field curves versus focal length, and a curve of distortion versus focal length according to the fourth preferred embodiment at the wide angle respectively.
Figure 5C:
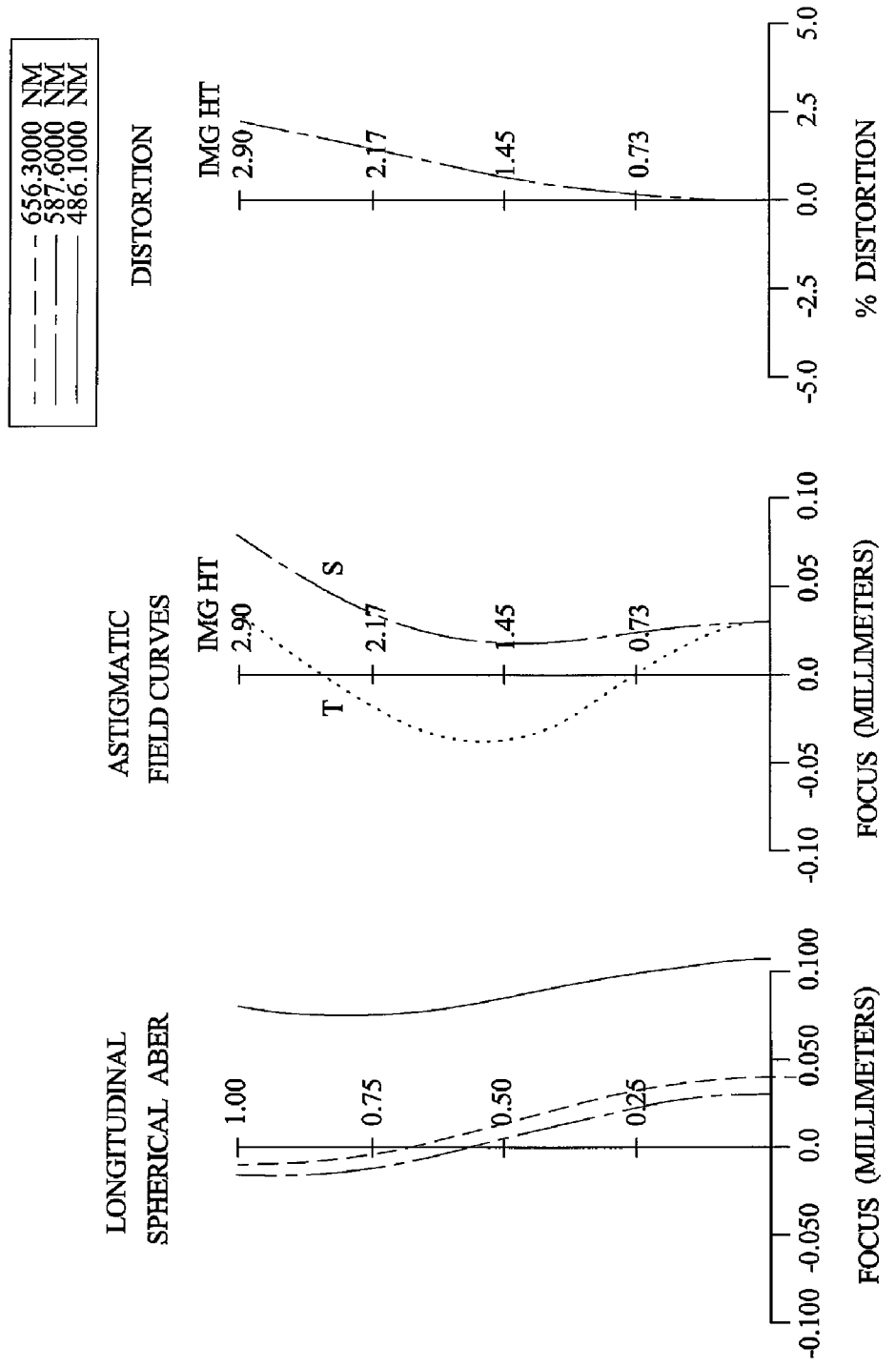
FIG. 5C plots curves of longitudinal spherical aberration versus focal length, astigmatic field curves versus focal length, and a curve of distortion versus focal length according to the fourth preferred embodiment at the intermediate focal length respectively.
Figure 5D:
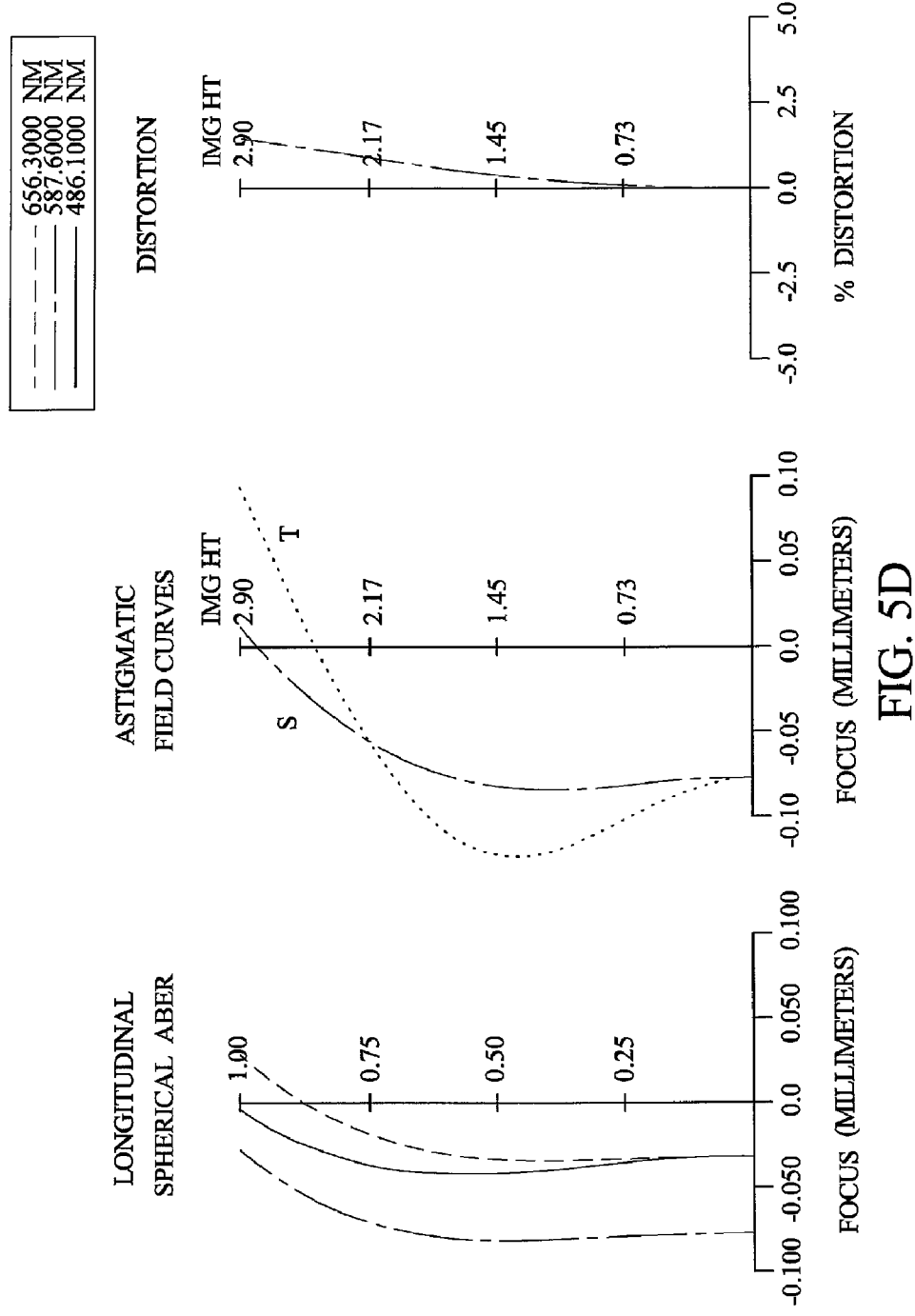
FIG. 5D plots curves of longitudinal spherical aberration versus focal length, astigmatic field curves versus focal length, and a curve of distortion versus focal length according to the fourth preferred embodiment at the narrow angle respectively.

Referring to FIGS. 2A to 2D, a high zoom ratio wide-angle zoom lens system in accordance with a first preferred embodiment of the invention is shown. FIG. 2A is similar to FIG. 1 except minor changes in the shapes. Further, distances of some lenses with respect to a reference point along an optical axis are designated by reference numerals d8, d16, d19, and 26. Above is also applied to second to fourth preferred embodiments of the invention as detailed later.

Initial optical data of the first embodiment is Fno=1:4.15-5.33, f=3.85-40.40, and w=36.98°-4.00° where Fno is the diameter of aperture at a wide angle or at a narrow angle, f is the focal length of the overall system at the wide angle or at the narrow angle, and w is half view angle at the wide angle or at the narrow angle. Specific numerical examples are shown in the following Table 1 in which r is the radius of curvature, d is an axial distance between any two lenses, n is the refractive index, and v is Abbe number which represents a value of chromatic aberration of a material, and v is inversely proportional to the value of chromatic aberration.

TABLE 1

| | r | d | n | v |
|---|---|---|---|---|
| Surface | INFINITY | 8000.000000 | AIR | |
| 1: | −65.09 | 1.00 | 1.836108 | 26.3 |
| 2: | 28.37 | 2.58 | | |
| 3: | −225.87 | 2.48 | 1.640601 | 58.3 |
| 4: | −50.86 | 0.10 | | |
| 5: | 76.59 | 2.82 | 1.731556 | 54.1 |
| 6: | −87.75 | 0.10 | | |
| 7: | 27.21 | 4.22 | 1.750631 | 49.7 |
| 8: | −80.30 | d8 | | |
| 9: | 29.60 | 1.00 | 1.806098 | 40.9 |
| 10: | 4.56 | 2.55 | AIR | |
| 11: | −15.67 | 1.00 | 1.799227 | 41.8 |
| 12: | 21.96 | 0.10 | | |
| 13: | 10.67 | 2.98 | 1.744132 | 26.6 |
| 14: | −9.51 | 0.10 | | |
| 15: | −14.49 | 1.00 | 1.795994 | 42.2 |
| 16: | 47.34 | d16 | | |
| Aperture | INFINITY | 0.10 | | |
| 18: | 24.43 | 1.39 | 1.588071 | 49.0 |
| 19: | −57.36 | d19 | AIR | |
| 20: | 10.63 | 3.80 | 1.530666 | 65.7 |
| 21: | −7.74 | 1.00 | 1.819815 | 32.7 |
| 22: | 36.78 | 0.10 | | |
| 23: | 11.65 | 3.02 | 1.500616 | 61.3 |
| 24: | −13.17 | 6.09 | | |
| 25: | A(1) | 2.75 | 1.528992 | 53.6 |
| 26: | A(2) | d26 | | |
| 27: | INFINITY | 1.00 | n = 1.51680 | v = 64.2 |
| 28: | INFINITY | 1.00 | | |
| IMG | INFINITY | 0.00 | AIR | |

(Imaging surface)

Among the lens group, one surface (R25) of the thirteenth lens L13 and the other surface (R26) thereof are aspheric lenses and data of the aspheric coefficient is detailed below.

| ASPHERIC | CURV | K | A | B | C | D |
|---|---|---|---|---|---|---|
| A(1) | −0.01195716 | 133.280681 | −2.28426E−03 | −5.47008E−05 | 6.49244E−06 | −6.97404E−07 |
| A(2) | 0.06611263 | −30.924561 | −7.11475E−04 | −7.87725E−05 | 9.10356E−06 | −7.45500E−07 |

Variables d8, d16, d19 and d26 have the following data when the focal length changes:

|  | Z1 | Z2 | Z3 |
|---|---|---|---|
| Fno | 4.15 | 5.32 | 5.33 |
| f | 3.85 | 23.11 | 40.40 |
| w | 36.98° | 7.1° | 4.0° |
| d8 | 1.00 | 16.77 | 20.42 |
| d16 | 20.27 | 4.58 | 1.19 |
| d19 | 13.40 | 4.94 | 4.10 |
| d26 | 1.98 | 9.48 | 10.14 |

For achieving the goals of having a wide angle of at least 70-degree and "10×" zoom, the zoom lens system of the invention is required to satisfy the following conditions:

(a) R1/R2=−2.3;
(b) $f_w/f_1=0.14$;
(c) $f_w/f_2=-0.6$;
(d) $f_w/f_3=0.13$; and
(e) $f_w/f_4=0.2$;

where R1 is a curvature of a first surface of the first lens L1, R2 is a curvature of a second surface of the first lens L2, $f_w$ is a focal length of the overall system at a wide angle, $f_1$ is a focal length of the first lens group G1, $f_2$ is a focal length of the second lens group G2, $f_3$ is a focal length of the third lens group G3, and $f_4$ is a focal length of the fourth lens group G4.

Radial changes of the aspheric lens can be expressed in the following equation:

$$Z = \frac{(curv)Y^2}{1 + (1 - (1+K)(curv)^2 Y^2)} + (A)Y^4 + (B)Y^6 + (C)Y^8 + (D)Y^{10}$$

where Z is the amount of sag, curv is the radius of curvature, K is the second curvature constant, Y is the height of the lens with respect to the optical axis, A is fourth aspheric coefficient, B is sixth aspheric coefficient, C is eighth aspheric coefficient, and D is tenth aspheric coefficient.

Second Embodiment

Referring to FIGS. 3A to 3D, a high zoom ratio wide-angle zoom lens system in accordance with a second preferred embodiment of the invention is shown. Initial optical data of the second embodiment is Fno=1:4.2-6.52, f=3.76-39.74, and w=37.1°-4.0° where Fno is the diameter of aperture at the wide angle or at the narrow angle, f is the focal length of the overall system at the wide angle or at the narrow angle, and w is half view angle at the wide angle or at the narrow angle. Specific numerical examples are shown in the following Table 2 in which r is the radius of curvature, d is an axial distance between any two lenses, n is the refractive index, and v is Abbe number.

TABLE 2

| Surface | r | d | n | v |
|---|---|---|---|---|
| 1: | INFINITY | 8000.000000 | AIR |  |
|  | −426.16 | 1.00 | 1.774841 | 25.6 |
| 2: | 21.27 | 2.63 |  |  |
| 3: | 408.78 | 3.99 | 1.562885 | 63.0 |
| 4: | −22.27 | 2.25 | 1.807752 | 36.9 |
| 5: | −31.38 | 0.10 |  |  |
| 6: | 23.00 | 4.27 | 1.759989 | 47.8 |
| 7: | −93.93 | 1.00 |  |  |
| 8: | −240.75 | d8 | 1.727911 | 54.7 |
| 9: | 4.78 | 1.95 | AIR |  |
| 10: | −48.13 | 1.00 | 1.640778 | 58.3 |
| 11: | 14.09 | 0.11 |  |  |
| 12: | A(1) | 1.62 | 1.755201 | 27.6 |
| 13: | A(2) | 0.10 |  |  |
| 14: | 15.99 | 1.55 | 1.846660 | 23.8 |
| 15: | 57.07 | 21.73 |  |  |
| Aperture: | INFINITY | 0.10 |  |  |
| 17: | 47.78 | 1.31 | 1.792813 | 42.6 |
| 18: | −44.59 | 14.00 | AIR |  |
| 19: | 8.92 | d19 | 1.528851 | 65.8 |
| 20: | −7.60 | 1.40 | 1.812367 | 32.1 |
| 21: | 28.86 | 0.10 |  |  |
| 22: | 13.09 | 2.56 | 1.508057 | 57.3 |
| 23: | −11.91 | 5.63 |  |  |
| 24: | A(3) | 1.86 | 1.525976 | 55.8 |
| 25: | A(4) | 1.77 |  |  |
| 26: | INFINITY | d26 | n=1.51680 | v = 64.2 |
| 27: | INFINITY | 1.00 |  |  |
| IMG: | INFINITY | 0.00 | AIR |  |

(imaging surface)

Among the lens group, one surface (R12) of the seventh lens L7 and the other surface (R13) thereof, and one surface (R24) of the thirteenth lens L13 and the other surface (R25) thereof are aspheric lenses and data of the aspheric coefficient is detailed below.

| ASPHERIC | CURV | K | A | B | C | D |
|---|---|---|---|---|---|---|
| A(1) | 0.03225408 | −83.262065 | 1.22060E−03 | −6.27430E−05 | 8.04419E−06 | −2.19785E−07 |
| A(2) | 0.00031715 | 1000.000000 | 2.54885E−04 | −4.53630E−05 | 6.06969E−06 | −1.74155E−07 |
| A(3) | −0.03855038 | −98.309044 | −4.38115E−03 | 2.37560E−05 | −2.59511E−06 | −2.20317E−07 |
| A(4) | 0.06040181 | 20.411890 | −3.61585E−03 | 2.37991E−05 | −1.95211E−06 | −4.87501E−07 |

Variables d7, d15, d18 and d25 have the following data when the focal length changes:

|     | Z1    | Z2     | Z3     |
| --- | ----- | ------ | ------ |
| Fno | 4.20  | 5.82   | 6.52   |
| f   | 3.7585| 22.5360| 39.7414|
| w   | 37.1° | 7.1°   | 4.0°   |
| d7  | 1.00  | 18.71  | 21.69  |
| d15 | 21.73 | 4.84   | 1.00   |
| d18 | 14.00 | 7.24   | 4.02   |
| d25 | 1.766 | 8.52   | 10.82  |

For achieving the goals of having a wide angle of at least 70-degree and "10×" zoom, the zoom lens system of the invention is required to satisfy the following conditions:

(a) $R1/R2=-20.0$;
(b) $f_w/f_1=0.13$;
(c) $f_w/f_2=-0.53$;
(d) $f_w/f_3=0.13$; and
(e) $f_w/f_4=0.20$;

where R1 is a curvature of a first surface of the first lens L1, R2 is a curvature of a second surface of the first lens L2, $f_w$ is a focal length of the overall system at a wide angle, $f_1$ is a focal length of the first lens group G1, $f_2$ is a focal length of the second lens group G2, $f_3$ is a focal length of the third lens group G3, and $f_4$ is a focal length of the fourth lens group G4.

Third Embodiment

Referring to FIGS. 4A to 4D, a high zoom ratio wide-angle zoom lens system in accordance with a third preferred embodiment of the invention is shown. Initial optical data of the second embodiment is Fno=1:4.23-6.22, f=3.88-40.8, and w=36.2°-3.95° where Fno is the diameter of aperture at the wide angle or at the narrow angle, f is the focal length of the overall system at the wide angle or at the narrow angle, and w is half view angle at the wide angle or at the narrow angle. Specific numerical examples are shown in the following Table 3 in which r is the radius of curvature, d is an axial distance between any two lenses, n is the refractive index, and v is Abbe number.

TABLE 3

|          | r         | d           | n        | v       |
| -------- | --------- | ----------- | -------- | ------- |
| Surface  | INFINITY  | 8000.000000 | AIR      |         |
| 1:       | −60.26    | 1.00        | 1.836326 | 26.5    |
| 2:       | 31.31     | 2.13        |          |         |
| 3:       | −743.32   | 2.35        | 1.710459 | 55.3    |
| 4:       | −51.14    | 0.10        |          |         |
| 5:       | 59.32     | 2.57        | 1.690783 | 56.1    |
| 6:       | −165.56   | 0.10        |          |         |
| 7:       | 27.32     | 3.95        | 1.756432 | 48.5    |
| 8:       | −96.56    | d8          |          |         |
| 9:       | 48.84     | 1.00        | 1.802704 | 41.3    |
| 10:      | 4.60      | 1.83        | AIR      |         |
| 11:      | 26.401    | 1.00        | 1.748836 | 44.4    |
| 12:      | 9.61      | 0.22        |          |         |
| 13:      | A(1)      | 2.712       | 1.759941 | 26.0    |
| 14:      | A(2)      | 0.10        |          |         |
| 15:      | −11.52    | 1.00        | 1.740384 | 51.9    |
| 16:      | 79.28     | d16         |          |         |
| Aperture:| INFINITY  | 0.10        |          |         |
| 18:      | 29.08     | 1.34        | 1.627436 | 54.3    |
| 19:      | −42.25    | d19         | AIR      |         |
| 20:      | 11.83     | 3.77        | 1.533543 | 64.7    |
| 21:      | −7.07     | 1.00        | 1.823039 | 31.2    |
| 22:      | −578.37   | 0.11        |          |         |
| 23:      | 19.68     | 3.93        | 1.495832 | 64.2    |
| 24:      | −11.14    | 6.49        |          |         |
| 25:      | A(3)      | 1.17        | 1.693112 | 49.5    |
| 26:      | A(4)      | d26         |          |         |
| 27:      | INFINITY  | 1.00        | n = 1.51680 | v = 64.2 |
| 28:      | INFINITY  | 1.00        |          |         |
| IMG:     | INFINITY  | 0.00        | AIR      |         |

(imaging surface)

Among the lens group, one surface (R13) of the seventh lens L7 and the other surface (R14) thereof, and one surface (R25) of the thirteenth lens L13 and the other surface (R26) thereof are aspheric lenses and data of the aspheric coefficient is detailed below.

| ASPHERIC | CURV       | K         | A            | B             | C            | D            |
| -------- | ---------- | --------- | ------------ | ------------- | ------------ | ------------ |
| A(1)     | 0.08295635 | −5.448513 | 6.00781E−04  | −1.36227E−05  | 1.26162E−06  | −3.32472E−08 |
| A(2)     | −0.08662060| 3.294174  | −1.78116E−04 | −9.47821E−06  | 1.05270E−06  | −5.11438E−08 |
| A(3)     | 0.02330392 | 68.871182 | −4.12361E−03 | 7.85338E−05   | −6.66906E−06 | −3.42850E−07 |
| A(4)     | 0.08615762 | 2.252122  | −4.20989E−03 | 1.46807E−04   | −1.12529E−05 | −3.51121E−08 |

Variables d8, d16, d19 and d26 have the following data when the focal length changes:

|     | Z1     | Z2      | Z3      |
| --- | ------ | ------- | ------- |
| Fno | 4.23   | 5.62    | 6.22    |
| f   | 3.8800 | 23.2902 | 40.8018 |
| w   | 36.2°  | 6.95°   | 3.95°   |
| d8  | 1.02   | 16.39   | 21.00   |
| d16 | 20.92  | 4.36    | 1.05    |
| d19 | 10.69  | 4.59    | 4.49    |
| d26 | 1.75   | 9.03    | 7.86    |

For achieving the goals of having a wide angle of at least 70-degree and "10×" zoom, the zoom lens system of the invention is required to satisfy the following conditions:

(a) $R1/R2=-1.9$;
(b) $f_w/f_1=0.13$;
(c) $f_w/f_2=-0.58$;
(d) $f_w/f_3=0.14$; and
(e) $f_w/f_4=0.21$;

where R1 is a curvature of a first surface of the first lens L1, R2 is a curvature of a second surface of the first lens L2, $f_w$ is a focal length of the overall system at a wide angle, $f_1$ is a focal length of the first lens group G1, $f_2$ is a focal length of the second lens group G2, $f_3$ is a focal length of the third lens group G3, and $f_4$ is a focal length of the fourth lens group G4.

Fourth Embodiment

Referring to FIGS. 5A to 5D, a high zoom ratio wide-angle zoom lens system in accordance with a fourth preferred embodiment of the invention is shown. Initial optical data of the second embodiment is Fno=1:4.23-6.72, f=3.85-40.396, and w=36.98°-4.07° where Fno is the diameter of aperture at the wide angle or at the narrow angle, f is the focal length of the overall system at the wide angle or at the narrow angle, and w is half view angle at the wide angle or at the narrow angle. Specific numerical examples are shown in the following Table 4 in which r is the radius of curvature, d is an axial distance between any two lenses, n is the refractive index, and v is Abbe number.

TABLE 4

| Surface | r | d | n | v |
|---|---|---|---|---|
| | INFINITY | 8000.000000 | AIR | |
| 1: | −56.37 | 1.00 | 1.839256 | 25.7 |
| 2: | 29.89 | 2.82 | | |
| 3: | −118.33 | 2.95 | 1.636770 | 48.4 |
| 4: | −42.12 | 0.10 | | |
| 5: | 41.51 | 3.77 | 1.707429 | 55.4 |
| 6: | −87.75 | 0.10 | | |
| 7: | 36.95 | 3.67 | 1.763127 | 47.3 |
| 8: | −98.52 | d8 | | |
| 9: | 36.74 | 1.00 | 1.810630 | 37.7 |
| 10: | 4.41 | 3.85 | AIR | |
| 11: | −23.40 | 4.16 | 1.781827 | 26.6 |
| 12: | −6.85 | 0.10 | | |
| 13: | −12.16 | 1.00 | 1.744428 | 51.0 |
| 14: | −177.04 | 0.28 | | |
| 15: | −15.72 | 1.00 | 1.693641 | 56.0 |
| 16: | −37.18 | d16 | | |
| Aperture: | INFINITY | 0.10 | | |
| 18: | 14.86 | 1.34 | 1.600761 | 58.6 |
| 19: | 54.05 | d19 | AIR | |
| 20: | 9.44 | 2.97 | 1.518162 | 52.8 |
| 21: | −8.48 | 1.00 | 1.818500 | 33.2 |
| 22: | 20.98 | 0.10 | | |
| 23: | 7.27 | 2.66 | 1.492027 | 69.7 |
| 24: | −24.35 | 5.59 | | |
| 25: | A(1) | 1.71 | 1.648858 | 33.9 |
| 26: | A(2) | d26 | | |
| 27: | INFINITY | 1.00 | n = 1.51680 | v = 64.2 |
| 28: | INFINITY | 1.00 | | |
| IMG: | INFINITY | 0.00 | AIR | |

(imaging surface)

Among the lens group, one surface (R25) of the thirteenth lens L13 and the other surface (R26) thereof are aspheric lenses and data of the aspheric coefficient is detailed below.

| ASPHERIC | CURV | K | A | B | C | D |
|---|---|---|---|---|---|---|
| A(1) | −0.01702400 | 424.063941 | −4.59088E−03 | −2.55640E−05 | 1.04552E−06 | −1.34991E−06 |
| A(2) | 0.05361846 | −115.549432 | −1.81870E−03 | −1.67702E−04 | 1.71618E−05 | −1.28758E−06 |

Variables d8, d16, d19 and d26 have the following data when the focal length changes:

| | Z1 | Z2 | Z3 |
|---|---|---|---|
| Fno | 4.23 | 5.92 | 6.72 |
| f | 3.8500 | 23.2902 | 40.396 |
| w | 36.98° | 7.12° | 4.07° |
| d8 | 1.00 | 18.00 | 21.77 |
| d16 | 21.81 | 4.81 | 1.00 |
| d19 | 12.44 | 5.30 | 4.62 |
| d26 | 4.46 | 11.88 | 12.37 |

For achieving the goals of having a wide angle of at least 70-degree and "10×" zoom, the zoom lens system of the invention is required to satisfy the following conditions:

(a) R1/R2=−1.9;
(b) $f_w/f_1$=0.13;
(c) $f_w/f_2$=−0.56;
(d) $f_w/f_3$=0.11; and
(e) $f_w/f_4$=0.18;

where R1 is a curvature of a first surface of the first lens L1, R2 is a curvature of a second surface of the first lens L2, $f_w$ is a focal length of the overall system at a wide angle, $f_1$ is a focal length of the first lens group G1, $f_2$ is a focal length of the second lens group G2, $f_3$ is a focal length of the third lens group G3, and $f_4$ is a focal length of the fourth lens group G4.

The zoom lens system of the invention has the following advantages and characteristics: Wide angle of view of at least 70-degree, high zoom ratio (e.g., as high as "10×"), compactness, and lightweight. Moreover, the thirteenth lens L13 is an aspheric lens formed of a plastic material. The remaining lenses are conventional glass lenses. The aspheric lens can compensate aberration of the zoom lens system. Hence, the production cost is greatly reduced. In addition, the second and third lenses L2, L3 are formed as a doublet lens by applying adhesive therebetween so as to facilitate assembly.

While the invention has been described in terms of preferred embodiments, those skilled in the art will recognize that the invention can be practiced with modifications within the spirit and scope of the appended claims.

What is claimed is:

1. A high zoom ratio wide-angle zoom lens system comprising:
a first lens group comprising a first lens of biconcave, a second lens of positive meniscus, a third lens of biconvex, and a fourth lens of biconvex wherein the first lens and the second lens are lenses not cemented together by adhesive;
a second lens group comprising a fifth lens of positive meniscus, a sixth lens of biconcave, a seventh lens of biconvex, and an eighth lens of plano-concave;
a third lens group comprising a ninth lens of biconvex; and
a fourth lens group comprising a tenth lens of biconvex, an eleventh lens of plano-concave, a twelfth lens of biconvex, and a thirteenth lens of aspheric;
wherein the zoom lens system satisfies the following conditions (a)-(e):
(a): −20.03<R1/R2<−1.89;
(b): 0.13<$f_w/f_1$<0.14;
(c): −0.6<$f_w/f_2$<−0.53;
(d): 0.11<$f_w/f_3$<0.14; and
(e): 0.18<$f_w/f_4$<0.21
where R1 is a curvature of a first surface of the first lens, R2 is a curvature of a second surface of the first lens, $f_w$ is a focal length of the overall system at a wide angle, $f_1$ is a focal length of the first lens group, $f_2$ is a focal length of the second lens group, $f_3$ is a focal length of the third lens group, and $f_4$ is a focal length of the fourth lens group.

2. The high zoom ratio wide-angle zoom lens system of claim 1, wherein the second and the third lenses are formed as a single lens by applying adhesive therebetween.

3. The high zoom ratio wide-angle zoom lens system of claim 1, wherein the seventh lens is an aspheric lens.

4. The high zoom ratio wide-angle zoom lens system of claim 1, wherein the thirteenth lens is an aspheric lens formed of a plastic material.

5. The high zoom ratio wide-angle zoom lens system of claim 1, wherein each of the first, second, and third lens groups is of positive diopter.

* * * * *